(12) United States Patent
Herbst et al.

(10) Patent No.: US 8,190,284 B1
(45) Date of Patent: *May 29, 2012

(54) AUTO DISCOVERY OF EMBEDDED HISTORIANS IN NETWORK

(75) Inventors: Robert J. Herbst, Aurora, OH (US); Frank Anthony Palmieri, Jr., Gibson, PA (US); Taryl J. Jasper, South Euclid, OH (US); Robert J. McGreevy, Oswego, IL (US); John T. Campbell, Bridgeville, PA (US); John J. Baier, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/783,229

(22) Filed: May 19, 2010

Related U.S. Application Data

(63) Continuation of application No. 11/536,522, filed on Sep. 28, 2006, now Pat. No. 7,742,833.

(51) Int. Cl.
G06F 19/00 (2011.01)
G06F 17/40 (2006.01)

(52) U.S. Cl. .................................... 700/108; 702/187

(58) Field of Classification Search .................. 700/19, 700/20, 108; 702/187, 188
See application file for complete search history.

(56) References Cited

U.S. PATENT DOCUMENTS

| | | | |
|---|---|---|---|
| 4,510,565 A | 4/1985 | Dummermuth | |
| 4,553,205 A | 11/1985 | Porchia | |
| 4,616,333 A | 10/1986 | Shimoni | |
| 4,718,025 A | 1/1988 | Minor et al. | |
| 4,731,735 A | 3/1988 | Borgendale et al. | |
| 4,773,028 A | 9/1988 | Tallman | |
| 4,831,529 A | 5/1989 | Miike et al. | |
| 4,975,865 A | 12/1990 | Carette et al. | |
| 5,003,469 A | 3/1991 | Kamiyama et al. | |
| 5,051,932 A | 9/1991 | Inove et al. | |
| 5,274,781 A | 12/1993 | Gibart | |
| 5,452,201 A | 9/1995 | Pieronek et al. | |
| 5,568,383 A | 10/1996 | Johnson et al. | |
| 5,611,059 A | 3/1997 | Benton et al. | |
| 5,805,442 A | 9/1998 | Crater et al. | |

(Continued)

FOREIGN PATENT DOCUMENTS

EP 0490864 B1 6/1992

(Continued)

OTHER PUBLICATIONS

OA dated Sep. 3, 2010 for U.S. Appl. No. 11/750,193, 68 pages.

(Continued)

*Primary Examiner* — Ryan Jarrett
(74) *Attorney, Agent, or Firm* — Turocy & Watson, LLP; Alexander R. Kuszewski; John M. Miller

(57) ABSTRACT

Systems and methods that facilitate discovery of history data via a locator component associated with a plant embedded historian(s) of an industrial programmer (e.g., a controller device.) Such locator component can further detect micro historians that are distributed on the back plane of an industrial network. The locator component can be part of applications running on a control unit, which can function as a management control center for the industrial network system. A common data model can be employed to expose functionality and data of the organization to the embedded historian component.

20 Claims, 11 Drawing Sheets

U.S. PATENT DOCUMENTS

| | | | |
|---|---|---|---|
| 5,812,394 A | 9/1998 | Lewis et al. |
| 5,870,309 A | 2/1999 | Lawman |
| 5,901,323 A | 5/1999 | Milliken et al. |
| 5,943,675 A | 8/1999 | Keith et al. |
| 5,950,006 A | 9/1999 | Crater et al. |
| 5,987,239 A | 11/1999 | Kirsch |
| 5,991,793 A | 11/1999 | Mukaida et al. |
| 6,092,036 A | 7/2000 | Hamann |
| 6,110,214 A | 8/2000 | Klimasauskas |
| 6,139,201 A | 10/2000 | Carbonell et al. |
| 6,198,480 B1 | 3/2001 | Cotugno et al. |
| 6,204,782 B1 | 3/2001 | Gonzalez et al. |
| 6,219,649 B1 | 4/2001 | Jameson |
| 6,233,623 B1 | 5/2001 | Jeffords et al. |
| 6,252,589 B1 | 6/2001 | Rettig et al. |
| 6,263,487 B1 | 7/2001 | Stripf et al. |
| 6,298,393 B1 | 10/2001 | Hopsecger |
| 6,298,454 B1 | 10/2001 | Schleiss et al. |
| 6,385,496 B1 | 5/2002 | Irwin et al. |
| 6,411,987 B1 | 6/2002 | Steger et al. |
| 6,505,247 B1 | 1/2003 | Steger et al. |
| 6,536,029 B1 | 3/2003 | Boggs et al. |
| 6,539,271 B2 | 3/2003 | Lech et al. |
| 6,559,861 B1 | 5/2003 | Kennelly et al. |
| 6,574,639 B2 | 6/2003 | Carey et al. |
| 6,584,488 B1 | 6/2003 | Brenner et al. |
| 6,618,856 B2 | 9/2003 | Coburn et al. |
| 6,633,782 B1 | 10/2003 | Schleiss et al. |
| 6,701,324 B1 | 3/2004 | Cochran et al. |
| 6,754,668 B2 | 6/2004 | Noble et al. |
| 6,754,885 B2 | 6/2004 | Dardinski et al. |
| 6,766,214 B1 | 7/2004 | Wang et al. |
| 6,795,798 B2 | 9/2004 | Eryurek et al. |
| 6,799,148 B2 | 9/2004 | Ling et al. |
| 6,847,850 B2 | 1/2005 | Grumelart |
| 6,847,854 B2 | 1/2005 | Discenzo |
| 6,865,644 B2 | 3/2005 | Husted et al. |
| 6,952,727 B1 | 10/2005 | Lindner et al. |
| 6,975,913 B2 | 12/2005 | Kreidler et al. |
| 6,976,247 B1 | 12/2005 | Altfeld |
| 7,043,311 B2 | 5/2006 | Nixon et al. |
| 7,050,873 B1 | 5/2006 | Discenzo |
| 7,069,201 B1 | 6/2006 | Lindner et al. |
| 7,152,222 B2 | 12/2006 | Kumhyr et al. |
| 7,181,370 B2 | 2/2007 | Furem et al. |
| 7,206,646 B2 | 4/2007 | Nixon et al. |
| 7,206,965 B2 | 4/2007 | Roddy et al. |
| 7,218,974 B2 | 5/2007 | Rumi et al. |
| 7,228,310 B2 | 6/2007 | O'Brien |
| 7,249,356 B1 | 7/2007 | Wilson et al. |
| 7,272,665 B2 | 9/2007 | Yamada et al. |
| 7,275,062 B2 | 9/2007 | Deitz et al. |
| 7,286,888 B2 | 10/2007 | Monette et al. |
| 7,299,367 B2 | 11/2007 | Hamm et al. |
| 7,328,078 B2 | 2/2008 | Sanford et al. |
| 7,359,930 B2 | 4/2008 | Jackson et al. |
| 7,406,453 B2 | 7/2008 | Mundie et al. |
| 7,546,577 B2 | 6/2009 | Do et al. |
| 7,568,184 B1 | 7/2009 | Roth |
| 7,574,417 B1 | 8/2009 | McGreevy et al. |
| 7,584,216 B2 | 9/2009 | Travieso et al. |
| 7,616,095 B2 | 11/2009 | Jones et al. |
| 7,620,885 B2 | 11/2009 | Moulckers et al. |
| 7,627,385 B2 | 12/2009 | McGreevy et al. |
| 7,672,740 B1 | 3/2010 | Baier et al. |
| 7,684,876 B2 | 3/2010 | Grgic |
| 7,693,585 B2 | 4/2010 | Kalan et al. |
| 7,742,833 B1 * | 6/2010 | Herbst et al. | 700/108 |
| 7,853,555 B2 | 12/2010 | Peoples et al. |
| 2002/0019839 A1 | 2/2002 | Shiu |
| 2002/0026317 A1 | 2/2002 | Labrique et al. |
| 2002/0054055 A1 | 5/2002 | Sone |
| 2002/0069235 A1 | 6/2002 | Chen |
| 2002/0120744 A1 | 8/2002 | Chellis et al. |
| 2002/0133523 A1 | 9/2002 | Ambler et al. |
| 2002/0165699 A1 | 11/2002 | Ling et al. |
| 2002/0169907 A1 | 11/2002 | Candea et al. |
| 2002/0174263 A1 | 11/2002 | Codd et al. |
| 2002/0184601 A1 | 12/2002 | Fitzhenry et al. |
| 2002/0184610 A1 | 12/2002 | Chong et al. |
| 2003/0014130 A1 | 1/2003 | Grumelart |
| 2003/0041135 A1 | 2/2003 | Keyes et al. |
| 2003/0100958 A1 | 5/2003 | Cachat et al. |
| 2003/0101208 A1 | 5/2003 | Chauvel et al. |
| 2003/0130899 A1 | 7/2003 | Ferguson et al. |
| 2003/0172107 A1 | 9/2003 | Leyfer et al. |
| 2003/0182303 A1 | 9/2003 | Gibson |
| 2004/0153437 A1 | 8/2004 | Buchan |
| 2004/0181294 A1 | 9/2004 | Deitz et al. |
| 2004/0225649 A1 | 11/2004 | Yeo et al. |
| 2005/0071755 A1 | 3/2005 | Harrington et al. |
| 2005/0085928 A1 | 4/2005 | Shani |
| 2005/0198034 A1 | 9/2005 | Boyer |
| 2005/0198406 A1 | 9/2005 | Sichner |
| 2005/0203648 A1 | 9/2005 | Martin |
| 2005/0210337 A1 | 9/2005 | Chester et al. |
| 2006/0004827 A1 | 1/2006 | Stuart |
| 2006/0020928 A1 | 1/2006 | Holloway et al. |
| 2006/0026559 A1 | 2/2006 | Gunturi et al. |
| 2006/0067334 A1 | 3/2006 | Ougarov et al. |
| 2006/0161268 A1 | 7/2006 | Frensch et al. |
| 2006/0218102 A1 | 9/2006 | Gibson et al. |
| 2006/0259160 A1 | 11/2006 | Hood et al. |
| 2006/0259499 A1 | 11/2006 | Moulckers et al. |
| 2006/0291283 A1 | 12/2006 | Jin et al. |
| 2006/0294502 A1 | 12/2006 | Das et al. |
| 2007/0006039 A1 | 1/2007 | Fichter et al. |
| 2007/0027913 A1 | 2/2007 | Jensen et al. |
| 2007/0028070 A1 | 2/2007 | Avergun et al. |
| 2007/0038610 A1 | 2/2007 | Omoigui |
| 2007/0050348 A1 | 3/2007 | Aharoni et al. |
| 2007/0073744 A1 | 3/2007 | McVeigh et al. |
| 2007/0112447 A1 | 5/2007 | McGreevy et al. |
| 2007/0112801 A1 | 5/2007 | McGreevy et al. |
| 2007/0136533 A1 | 6/2007 | Church et al. |
| 2007/0142941 A1 * | 6/2007 | McGreevy et al. | 700/83 |
| 2007/0156770 A1 | 7/2007 | Espelien |
| 2007/0244964 A1 | 10/2007 | Challenger et al. |
| 2007/0245339 A1 | 10/2007 | Bauman et al. |
| 2007/0282577 A1 | 12/2007 | Lind |
| 2007/0288795 A1 | 12/2007 | Leung et al. |
| 2007/0294078 A1 | 12/2007 | Kim et al. |
| 2008/0027678 A1 | 1/2008 | Miller |
| 2008/0082577 A1 | 4/2008 | Hood et al. |
| 2008/0098356 A1 | 4/2008 | Ericsson et al. |
| 2008/0126408 A1 | 5/2008 | Middleton |
| 2008/0127091 A1 | 5/2008 | Ericsson et al. |
| 2008/0263518 A1 | 10/2008 | Bank et al. |
| 2008/0313228 A1 | 12/2008 | Clark et al. |
| 2010/0146491 A1 | 6/2010 | Hirano et al. |

FOREIGN PATENT DOCUMENTS

| | | |
|---|---|---|
| EP | 1109107 | 6/2001 |
| EP | 1307823 | 5/2003 |
| GB | 2347234 | 8/2000 |
| GB | 2353616 A1 | 2/2001 |
| WO | 2004027531 A1 | 4/2004 |
| WO | 2005006130 A2 | 1/2005 |
| WO | 2005006130 A3 | 1/2005 |

OTHER PUBLICATIONS

OA dated Aug. 23, 2010 for U.S. Appl. No. 11/558,705, 44 pages.

OA dated Sep. 17, 2010 for U.S. Appl. No. 11/864,634, 43 pages.

OA dated Oct. 14, 2010 for U.S. Appl. No. 11/862,861, 43 pages.

"Proficy Historian"; Dec. 16, 2004, GE FANUC, pp. 1-8.

"Major Canadian Natural Gas Producer Buys AnyWhere/AnyTime Services from Industrial Evolution" Mar. 12, 2001, Industrial Evolution pp. 1.

Alvestrand. "Tags for the Identification of Languages: rfc 1766. txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.

Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.

EP Office Action for Application No. 08165215.8-1243 dated Mar. 3, 2009, 2 pages.

European Search Report and Written Opinion for European Application No. EP 08 16 5215, dated Dec. 8, 2008, 6 pages.

European Search Report dated Jan. 20, 2009 for European Patent Application No. EP08156281, 6 Pages.

European Search Report dated Dec. 18, 2007 for European Patent Application Serial No. 07117364.5-2221, 2 Pages.

European Search Report dated Feb. 22, 2008 for European Patent Application Serial No. EP 07 11 7388, 1 Page.

European Search Report for European Patent Application No. EP07117614 dated Feb. 5, 2008, 8 pgs.

European Search Report for European Patent Application No. EP07117622 dated May 2, 2008, 3 pgs.

Miller, et al. "Extending the Reach of Enterprise Data Management in a World of M2M." ISA EXPO. Oct. 2005, pp. 1-7.

Power Rich System, Enterprise Edition, Historian (PRS EE Historian) Version 1.5, last accessed Dec. 3, 2008, 15 pages.

Real Time Intelligence at the Source-Deploying and Embedded Historian. Users Conference 2005, pp. 1.

Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.

Wonderware Plant Intelligence Solution Helps Arla Foods Deliver Fresh Milk Products to the Tables of Europe. Last accessed Dec. 3, 2008, 4 pages.

CNOA Due Dec. 29, 2008 for Chinese Patent Application No. 200710162327.9, 6 pages.

European Search Report dated Mar. 25, 2010 for European Patent Application No. EP 07 12 0362, 6 pages.

"High Level Triggers, Data Acquisition and Controls." ATLAS Technical Design Report, Jun. 30, 2003, pp. 1-370, XP002570453, Chapters 1-7, 9, 11, 13. http://cdsweb.cern.ch/record/616089/files/cer-002375189.pdf. Last accessed Apr. 1, 2010, 196 pages.

Vermeulen, et al. "ATLAS Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.

Gameiro, et al. "The ROD Crate DAQ of the ATLAS Data Acquisition System." 14th IEEE—NPSS Real time Conference, Stockholm, Sweden, Jun. 4-10, 2005, pp. 527-531, XP010859117, ISBN: 978-0-7803-9183-3.

European Search Report dated Mar. 25, 2010 for European Patent Application No. EP 07 12 0357, 5 pages.

European Search Report dated Mar. 10, 2010 for European Application Serial No. EP 08 16 4957, 7 pages.

Charbonnier, et al. "Trends Extraction and Analysis for Complex System Monitoring and Decision Support." Feb. 1, 2005, Engineering Applications of Artificial Intelligence, Pineridge Press, Swansea, GB, pp. 21-36, XP025299588, ISSN: 0952-1976.

Uraikul, et al. "Artificial Intelligence for Monitoring and Supervisory Control of Process Systems." Nov. 30, 2006, Engineering Applications of Artificial Intelligence, Pineridge Press, Swansea, GB, pp. 115-131, XP005786108, ISSN: 0957-1976.

A new general purpose compression method for searching in large collection, Bhadade, U.S.; Sharma, V.K.; Trivedi, A. I.; TENCON 2007—2007 IEEE Region 10 Conference Digital Object Identifier: 10.11 09ITENCON.2007.4428935. Publication Year: 2007, pp. 1-4.

Input Data Representation for Self-Organizing Map in Software Classification, Yuqing Lin; Huilin Ye; Knowledge Acquisition and Modeling, 2009. KAM '09. Second International Symposium on vol. 2 Digital Object Identifier: 10.11 09/KAM2009.151, Publication Year: 2009, pp. 350-353.

Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31, Issue: 4. Digital Object Identifier: 10.11 09/TPAMI.2008.11 0 Publication Year: 2009, pp. 721-735.

Selecting predicate logic for knowledge representation by comparative study of knowledge representation schemes, Ali, A.; Khan, M.A.; Emerging Technologies, 2009. ICET 2009. International Conference on Digital Object Identifier: 10.11 09/ICET2009.5353207 Publication Year: 2009, pp. 23-28.

Notice of Allowance dated Jun. 13, 2010 for U.S. Appl. No.11/862,891, 49 pages.

OA dated Jan. 26, 2009 for U.S. Appl. No. 11/536,535, 40 pages.
OA dated Apr. 3, 2009 for U.S. Appl. No. 11/536,522, 20 pages.
OA dated Apr. 22, 2009 for U.S. Appl. No. 11/558,705, 23 pages.
OA dated Jul. 10, 2009 for U.S. Appl. No. 11/536,545, 30 pages.
OA dated Jul. 21, 2008 for U.S. Appl. No. 11/536,522, 21 pages.
OA dated Jul. 23, 2008 for U.S. Appl. No. 11/536,535, 31 pages.
OA dated Jul. 28, 2008 for U.S. Appl. No. 11/536,545, 26 pages.
OA dated Jul. 29, 2009 for U.S. Appl. No. 11/558,710, 18 pages.
OA dated Sep. 16, 2009 for U.S. Appl. No. 11/558,705, 23 pages.
OA dated Oct. 13, 2009 for U.S. Appl. No. 11/536,522, 22 pages.
OA dated Nov. 14, 2008 for U.S. Appl. No. 11/558,710, 18 pages.
OA dated Dec. 3, 2008 for U.S. Appl. No. 11/536,566, 35 pages.
OA dated Dec. 12, 2008 for U.S. Appl. No. 11/536,545, 18 pages.
OA dated Dec. 18, 2008 for U.S. Appl. No. 11/536,522, 15 pages.
OA dated Jan. 4, 2010 for U.S. Appl. No. 11/558,710, 37 pages.
OA dated Mar. 30, 2010 for U.S. Appl. No. 11/558,705, 44 pages.
OA dated Mar. 24, 2010 for U.S. Appl. No. 11/750,193, 36 pages.
OA dated Apr. 1, 2010 for U.S. Appl. No. 11/863,216, 28 pages.
OA dated Jun. 11, 2010 for U.S. Appl. No. 11/862,180, 27 pages.
OA dated Jun. 25, 2010 for U.S. Appl. No. 11/862,182, 41 pages.
OA dated Jul. 22, 2010 for U.S. Appl. No. 11/862,183, 39 pages.
OA dated May 27, 2010 for U.S. Appl. No. 11/537,110, 77 pages.
OA dated Jul. 8, 2010 for U.S. Appl. No. 11/558,710, 28 pages.
OA dated Jul. 23, 2010 for U.S. Appl. No. 11/536,550, 51 pages.

Notice of Allowance mailed Dec. 13, 2010 for U.S. Appl. No. 11/862,180, 74 pages.

Notice of Allowance mailed Nov. 9, 2010 for U.S. Appl. No. 11/537,110, 38 pages.

OA dated Jan. 4, 2011 for U.S. Appl. No. 11/536,550, 44 pages.

European Search Report dated Oct. 22, 2010 for European Patent Application No. EP 08 16 5010, 10 pages.

OA dated Mar. 21, 2011 for U.S. Appl. No. 12/691,302, 72 pages.
OA dated Mar. 31, 2011 for U.S. Appl. No. 11/537,144, 49 pages.
OA dated Mar. 3, 2011 for U.S. Appl. No. 11/864,634, 21 pages.

Notice of Allowance mailed Aug. 5, 2011 for U.S. Appl. No. 12/691,302, 78 pages.

OA dated Aug. 5, 2011 for U.S. Appl. No. 11/864,634, 20 pages.
OA dated Sep. 30, 2011 for U.S. Appl. No. 11/537,144, 14 pages.
OA dated Jan. 4, 2012 for U.S. Appl. No. 11/864,634, 20 pages.
OA dated Dec. 22, 2011 for U.S. Appl. No. 13/089,152, 42 pages.

* cited by examiner

_US 8,190,284 B1_

AUTO DISCOVERY OF EMBEDDED HISTORIANS IN NETWORK

TECHNICAL FIELD

The subject invention relates generally to historian components associated with industrial controllers and more particularly to discovery of embedded historian components and data type collected thereby.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. One common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

In general, conventional historian processors enable high-speed real-time data collection by communicating directly with the control processor across the backplane for fast data collection speeds. This includes handling large quantities of data over extended time periods while providing efficient storage and retrieval of process data over extended periods of time. These solutions are generally employed for electronic documentation and provide an audit trail and data flags for tracking modified, inserted, or incomplete data. In order to configure such products, a Graphical User Interface (GUI) can be provided to map controller tags defined in a local or remote processor to a data historian file.

However, there are several disadvantages with existing data collection and storage solutions. Conventional PC-historians are generally applied on the back-end of system design and are thus loosely coupled or integrated within the framework of the control architecture. Such an arrangement leads to many inefficiencies for collecting data and ultimately identifying what data should or should not be captured. Other shortcomings include issues related to which historians should collect what data, and how such historians map and integrate into a larger enterprise.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for systems and methods that facilitate discovery of history data via a locator component associated with a plant historian of an industrial programmer (e.g., a controller device.) Such locator component can further detect embedded historians that are distributed on the back plane of an industrial network. In general, such embedded historians (unlike conventional PC historians) supply a direct interface to controllers without employing a transitional layer, and hence provide a substantially higher data exchange rate as compared to conventional PC historians. The locator component can be part of applications running on a control unit, which can function as a management control center for the industrial network system.

In a related aspect, the locator component can define type of historian data to be automatically located and collected from the embedded historians, and further assigns type of historian data to be collected by such embedded historians. For example, the locator component can employ a trail of metadata to identify the embedded historians and relevant historian data for collection. Additionally, a polling/publication arrangement can also be employed wherein the embedded historians (e.g., microhistorians) identify themselves to the locator component upon occurrence of a predetermined event, and/or periodically.

Accordingly, a distributed and scalable framework can be provided, which enables data historian functionality to be efficiently incorporated at various levels of an enterprise. For example, from lower control levels of a plant, to middle tiers of the plant (which collect data from the lowest levels) and from enterprise levels that aggregate data from such lower and middle levels, the embedded historian components can interact with a locator component, to facilitates data collection across an organizational hierarchy. Such framework can employ a directory and location service to enable configuration of embedded historians and to allow automated integration at the various levels of the organization.

In a related methodology in accordance with an aspect of the subject innovation, users can initially determine type of data to be collected. The locator component is then notified for collection of such data type. The locator component can then locate embedded historians that have collected or have access to a collection of determined data type. Subsequently, the data can be acquired, supplied and reported to the user.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
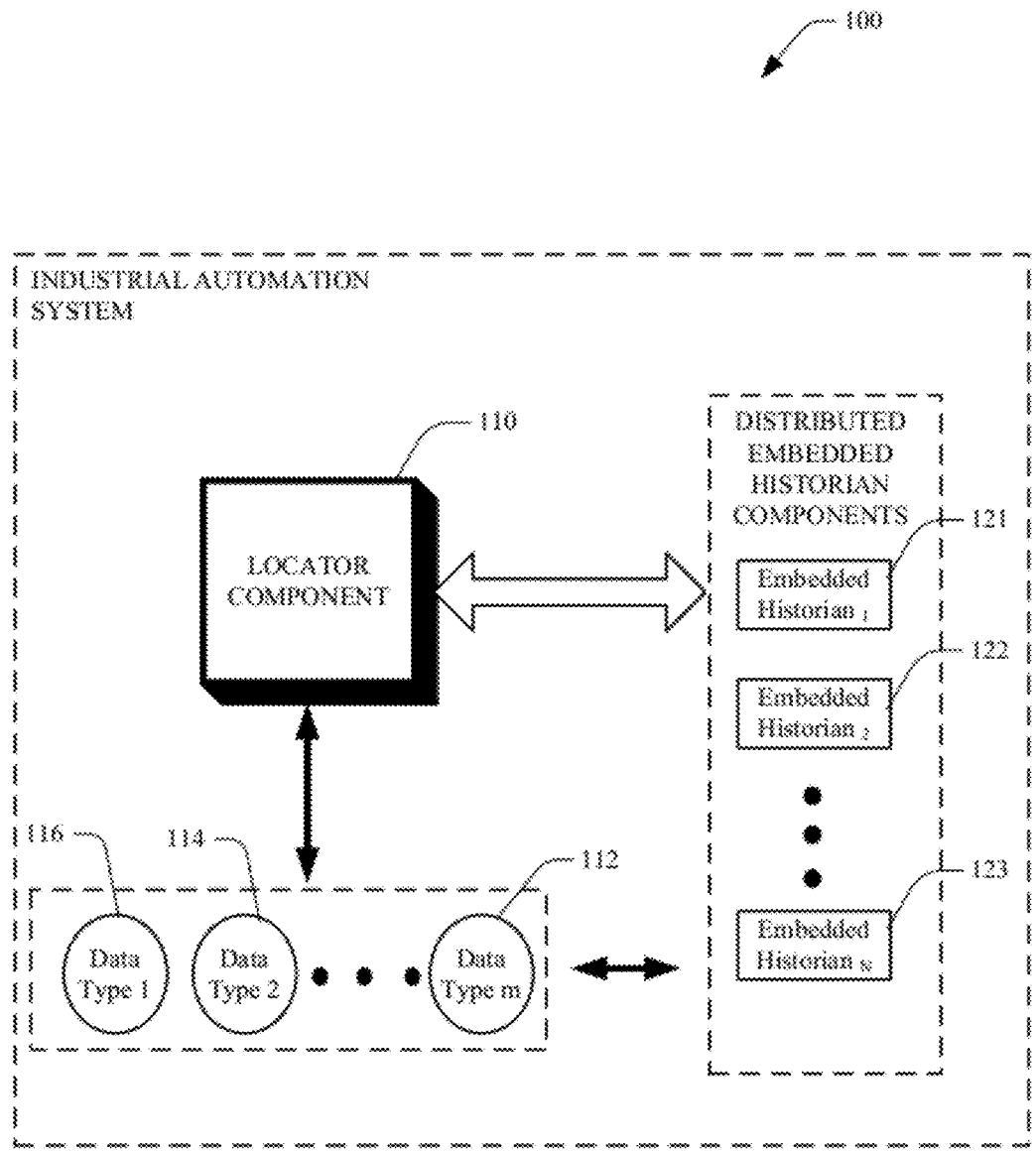
FIG. 1 is a schematic block diagram of a locator component that can detect embedded historians and respective data types collected thereby, in accordance with an aspect of the subject innovation.

FIG. 1 illustrates a locator component 110 that is associated with a plant embedded historian network of an industrial programmer system 100 (e.g., a network of controller devices), to facilitate discovery of history data. Such locator component 110 can further detect embedded historians that are distributed on the back plane of an industrial network. The locator component 110 can be part of applications running on a control unit, which can function as a management control center for the industrial network system 100. Accordingly, a distributed embedded historian framework is provided, wherein historical data types 112, 114, 116 (1 thru m, m being an integer) can be collected in accordance with an organizational model of a hierarchical system that is distributed across various elements of an enterprise. Such an arrangement enables data identified for historian purposes to be automatically collected and also allows embedded historian functionality to be exposed and thus efficiently integrated with other elements of an organization. These elements can include representations of the system that are maintained on higher-level business servers and other representations that serve control elements of the system such as programmable logic controllers and/or other industrial control components (e.g., sensors, modules, and the like), for example. As explained in detail infra, a directory service (not shown) can further operate with the organizational model to enable configuration of embedded historians within the organization, and to enable data types 112, 114, and 116 to be located within the organization.

For example, common organization functionality such as security services can be distributed to the embedded historians 121, 122, 123 according to the data model and directory service, wherein the common data model then exposes functionality and data of the organization to the distributed embedded historians 121, 122, 123. In contrast to conventional PC historians, embedded historians (e.g., micro historians) of the subject innovation are special purpose historians that reside in a backplane and supply direct interface (e.g., without a transition layer) to controllers and/or associated industrial units. Such embedded historians employ industrial specifications (e.g., regarding shock vibration, sealing, contamination proofing, and the like), and supply substantially higher data exchange speed as compared to conventional PC historians. A network system (not shown) can be associated with the industrial automation system 100, which can be searched via the locator component 110. The network system can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters.

It is noted that as used in this application, terms such as "component," "hierarchy," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 2:
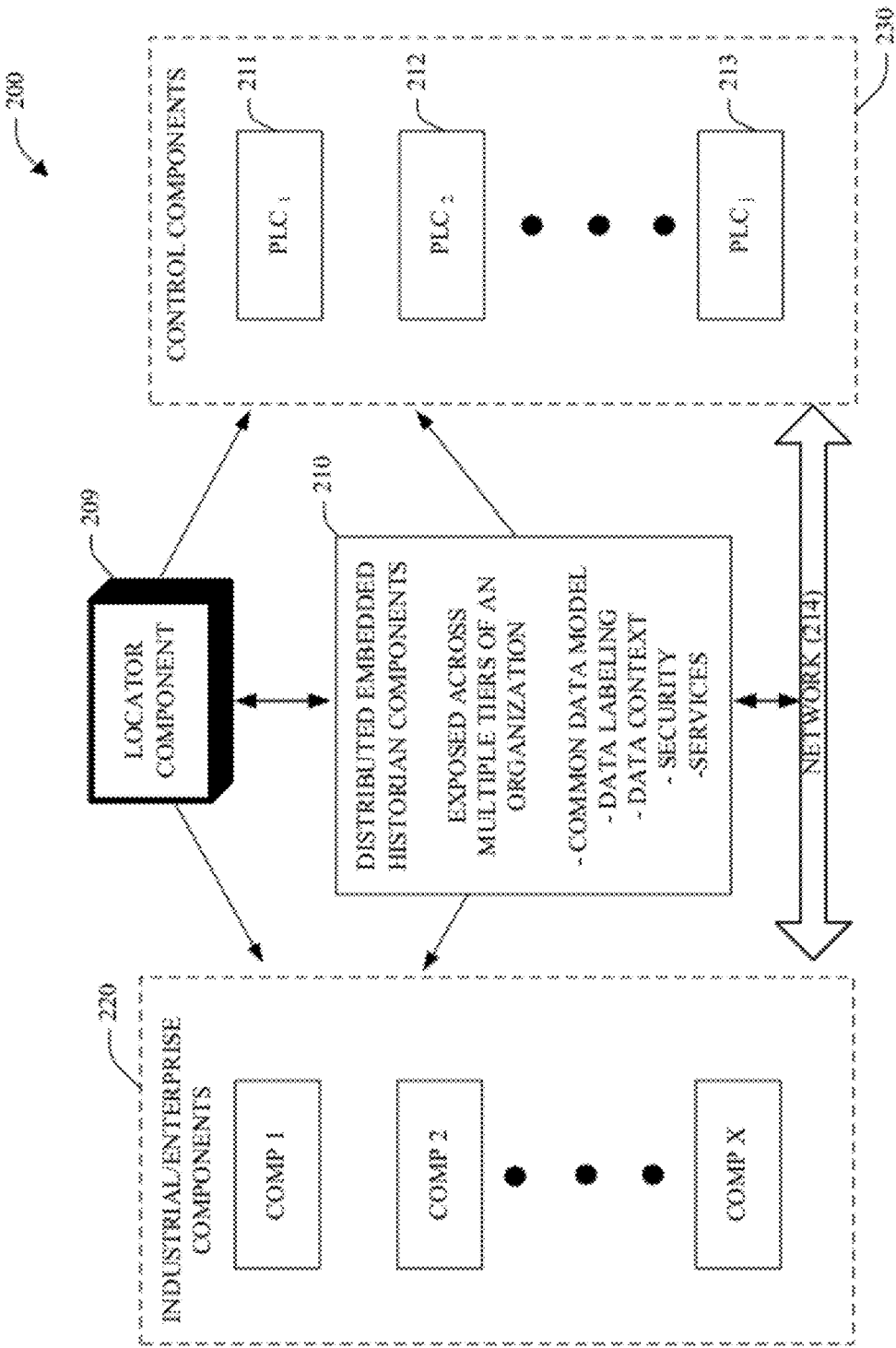
FIG. 2 illustrates a network of embedded historians within an industrial setting that interact with a locator component in accordance with an aspect of the subject innovation.

FIG. 2 illustrates a system 200 that includes a plurality of embedded historian components 210 operating in an organizational data model, wherein a locator component 209 can detect embedded historians (e.g., micro historians) that are distributed on the back plane of an associated industrial network. In addition, the embedded historian components 210 can be distributed across a network 214 to provide a collective or distributed database. The locator component 209 can be part of applications running on a control unit 230, which can function as a management control center for the industrial network system.

The industrial setting or organizational enterprise 200 can employ a plurality of computers or network components that communicate across the network 214, to one or more industrial control components 230, such as for example programmable logic controllers (PLCs) 211, 212, 213 (1 to j, j being an integer) or other factory components. Thus, the embedded historian components 210 can be operated as a singular or collective entity while being viewed, managed and distributed across substantially all or portions of the enterprise 220, control component 230 and/or locator component 209. For example, at the control levels 230, embedded historians can be embedded within a PLC rack to collect data, whereas higher levels at 220 can be employed to aggregate data from lower levels. Such can include higher level software components that communicate across the network 214 to collect data from lower level control components. The network 214 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and the like. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Likewise, the industrial/enterprise 220 can include various computer or network components such as servers, clients, communications modules, mobile computers, wireless components, and the like which are capable of interacting across the network 214. Similarly, the term PLC as used herein can include functionality that can be shared across multiple components, systems, and/or networks 214. For example, one or more PLCs of the control component 230 can communicate and cooperate with various network devices across the network 214. Such can include substantially any type of control, communications module, computer, I/O device, sensor, Human Machine Interface (HMI)) that communicate via the network 214 which includes control, automation, and/or public networks. The PLC 230 can also communicate to and control various other devices such as Input/Output modules including Analog, Digital, Programmed/Intelligent I/O modules, other programmable controllers, communications modules, and the like.

The system 200 enables combining organizational information such as an organizational or hierarchical data model which represents a common model of a plant that can be based in the S88 or S95 model, and is distributed among computers of the enterprise 220 and industrial controllers 230, for example. The model can be viewed as an Organizational Data Model—a tree-like hierarchical and heterogeneous structure of organizational Units. For instance, respective Organizational Units can include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, backing tags (e.g., Alarm & Event and the like), programs, equipment phases, I/O devices, and other application related entities. These organizational units thus can form an application view of the user's system.

A typical system 200 can assign the upper levels of the hierarchy such as an Enterprise node and site to a computer system and the lower levels such as area, line, cell and machine can be contained in multiple industrial controllers 230; each of which can include components that are members of one or more organization units such as area or area model. Moreover, an organization unit can contain components from one or more controllers. The embedded historian component 210 can be positioned at various levels of the enterprise 220 and/or control 230; and can also further be integrated therein and scaled according to system data collection requirements. Such organizational model enables embedded historian components 210 to locate data of interest for collection purposes and to readily adapt and become integrated within the larger system 200.

Adaptability within the system 200 can be facilitated by data having additional information such as metadata that identifies the purpose of the data. Such metadata can further be employed by the locator component 209 to identify a micro-historian. For example, the locator component 209 can employ a trail of metadata to identify the embedded historians and relevant historian data for collection Accordingly, one form of data can identify itself as a control tag that has been marked or labeled via metadata to indicate its significance for data collection purposes. Another type of label or metadata can indicate security information that is being distributed throughout the system 200. Furthermore, other type of data can indicate that an alarm condition or an event has occurred within the system and thus, a respective embedded historian component should capture such alarm or event. In general, the organizational model enables embedded historian components 210 to receive functionality or data context from the system 200 and to expose its respective functionality to the system via the model. For example, context allows embedded historian components to such auto configuration routines where one or more components of the embedded historian architecture can be automatically discovered and configured onto a respective system. Hence, the embedded historian components 210 and the locator component 209 can be automatically integrated within the system 200, to further facilitate scaling of the system as data conditions change.

In a related aspect, such scaling can include the ability of one or more components of an organization to collaborate, and provide an overall scheme for historical data collection. Such can include having lower level PLCs or factory components collecting data and sharing this data with higher levels of the organization. If one or more of the levels become overloaded with the data collection process, historian functionality can be shifted between levels (upwards or downwards) to more effectively employ system-wide resources in an efficient manner. For instance, communications between levels can allow sharing of data collection responsibilities between one or more levels of the enterprise from the very lowest levels through the higher levels of the organizational hierarchy.

For example, the lowest level entity can have sufficient memory for data collection of desired embedded historian or archived information. If such memory resources are consumed, messaging capabilities throughout the hierarchy can subsequently take over to distribute storage responsibilities from one layer to another via suitable network messages (wireless or wired) that communicate data from one level to another. It is to be appreciated that tiers of an organization can collaborate in many combinations. Thus, a high level tier could collaborate with a low level tier or collaboration can take place between multiple tiers if desired such as between higher levels, intermediate levels, and lower levels of an organization.

The locator component 209 can identify embedded historians (e.g., micro-historians), and notify them to collect various data types. The locator component 209 can subsequently locate embedded historians that have collected or have access to a collection of such data type. Next, the data can be acquired, supplied and reported to the user via a plurality of interfaces. Such interfaces can be supplied to manipulate the embedded historian components 210 and organizational data model; such as a Graphical User Interface (GUI) to interact with the model or other components of the hierarchy; e.g., as any type of application that sends, retrieves, processes, and/or manipulates factory or enterprise data, receives, displays, formats, and/or communicates data, and/or facilitates operation of the enterprise 220 and/or PLCs 230. For example, such interfaces can also be associated with an engine, server, client, editor tool or web browser although other type applications can be utilized.

Figure 3:
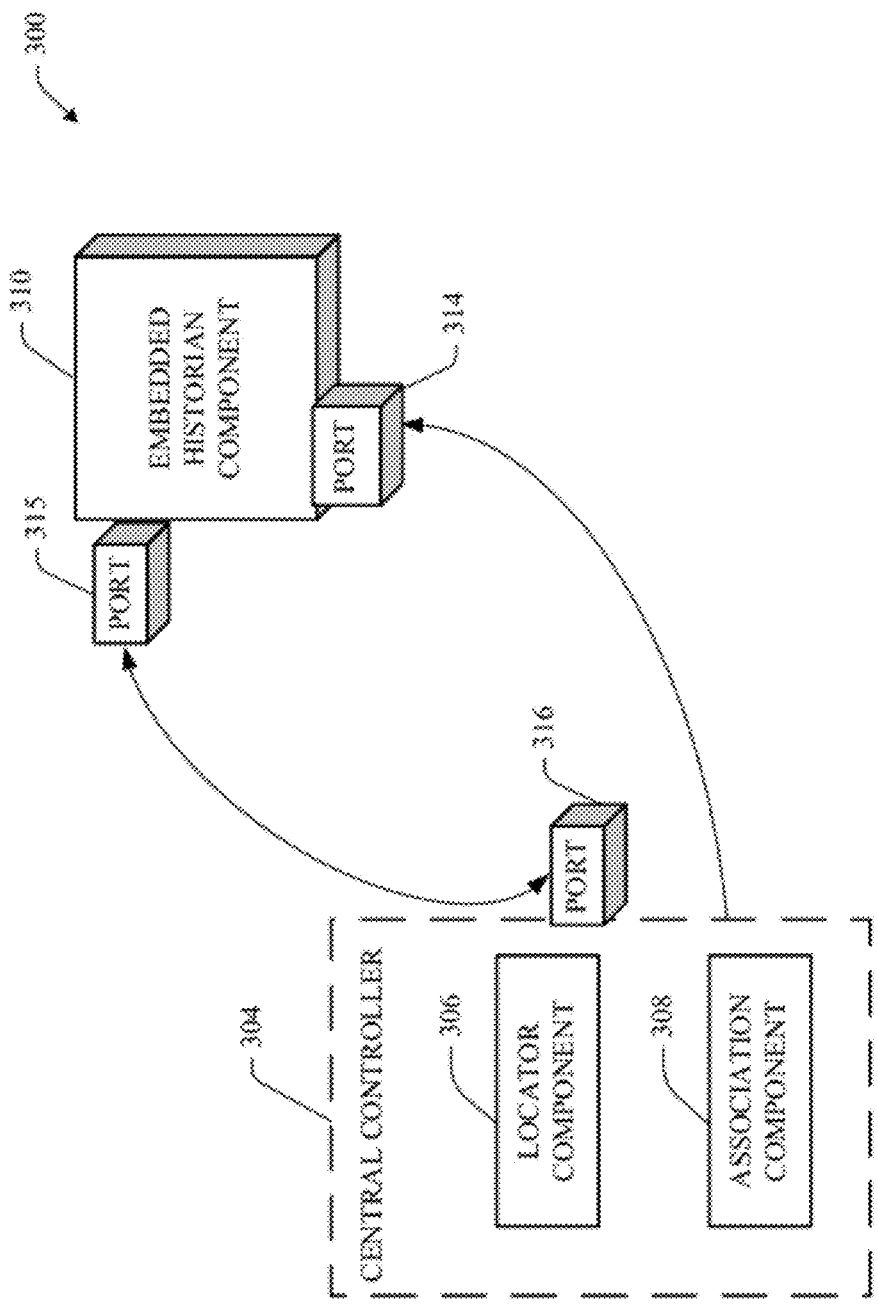
FIG. 3 illustrates a block diagram for a central controller that has a locator component communicating with an embedded historian in accordance with an aspect of the subject invention.

FIG. 3 illustrates a block diagram 300 for a central controller 304 with a locator component 306 in accordance with an aspect of the subject invention. The locator component 306 can employ a socket arrangement, wherein the embedded historian 310 initially identifies itself to the network and the central controller 304 via a socket bound to a specific port number 314. Such socket can function as one end point of two-way communication link between programs running on a network or the central controller 304, and it can be bound to a port number for identification purposes during data communication. Likewise, on the central controller 304, the port number 316 to which the embedded historian component communicates with, can be identified. To initiate a connection, the central controller can attempt a rendezvous with the embedded historian component on the port 314 associated with such embedded historian component. Upon acceptance of the connection, a new socket (and consequently a new port 315) can be assigned, so that the embedded historian component 310 can continue to listen to the original socket for connection request, while supplying data to the central controller 304 via the newly created socket. In a related aspect of the subject invention an association component 308 can determine a data type that the embedded historian component collects and whether it is in fact a desired unit to which communication is requested therewith.

Figure 4:
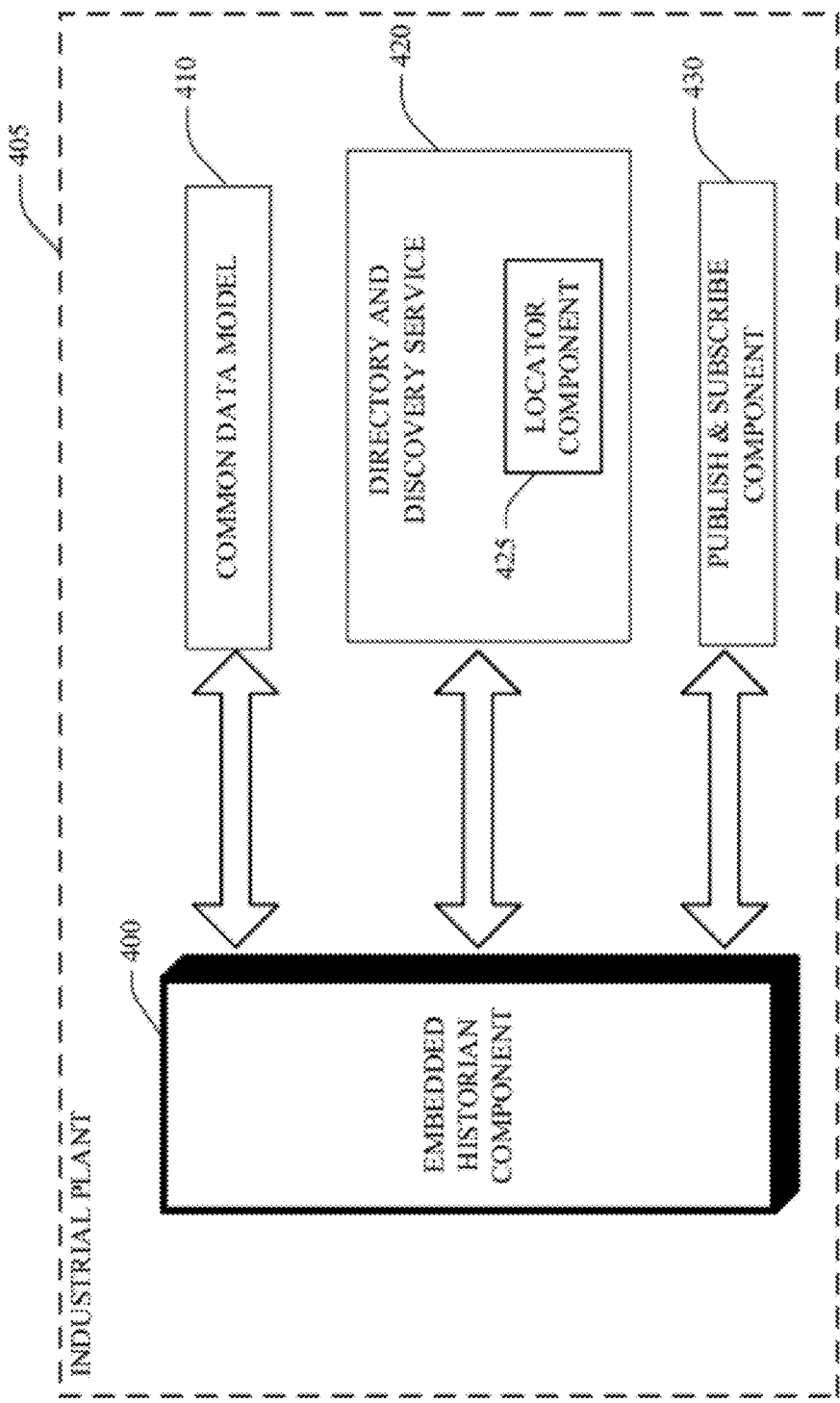
FIG. 4 illustrates a locator component in conjunction with an embedded historian integrated with a hierarchical data structure.

FIG. 4 illustrates a locator component 425 that is operatively connected to embedded historian network/embedded historians 400 in accordance with an aspect of the subject innovation. The industrial setting 405 can employ a hierarchical data model with various levels; e.g., enterprise level, site level (factory represented within a data packet), area level (an area within the factory associated with the data); line level (a line associated with particular data), a work-cell level (that indicates a work-cell associated with the data) and the like. For example by employing a nested, hierarchical data model, embedded historian components 400 can readily become aware of data associated therewith. Furthermore, such hierarchy can further be customized by users to obtain increased granularity within the hierarchy. The common plant model can enable the embedded historian component 400 to determine data contexts in an automated manner. The common data model 410 allows data to be marked or labeled via metadata for example to both expose embedded historian functionality to a system and/or to allow the embedded historian component 400 to be automatically integrated within the system according to data that is exposed to the embedded historian component. For example, one such labeling can pertain to security, and typically can affect substantially all components in the system associated with the common model 410.

The locator component 425 can be associated with a directory and discovery service. Such an arrangement enables the embedded historian component 400 to locate other embedded historian components in the system and to receive/expose historian data to other system components. This can include a network directory that determines physical addresses from logical names and vice versa, for example. Moreover, the publish and subscribe component 430 can provide subscription functionality to the embedded historian component 400, wherein data collection efficiency of the system can be enhanced. For example, the publish and subscribe component 430 of the system 405 allows data to be published or generated when a change in the data has been detected. Thus, the embedded historian component 400 can subscribe to such change events and thus only record data when a change has occurred which reduces the amount of data to be stored. Furthermore, the locator component 425 can employ a trail of metadata to identify the micro-historians and relevant historian data for collection. Additionally, a polling/publication arrangement can also be employed wherein the embedded historians (e.g., micro—historians) identify themselves to the locator component upon occurrence of a predetermined event, and/or periodically.

Figure 5:
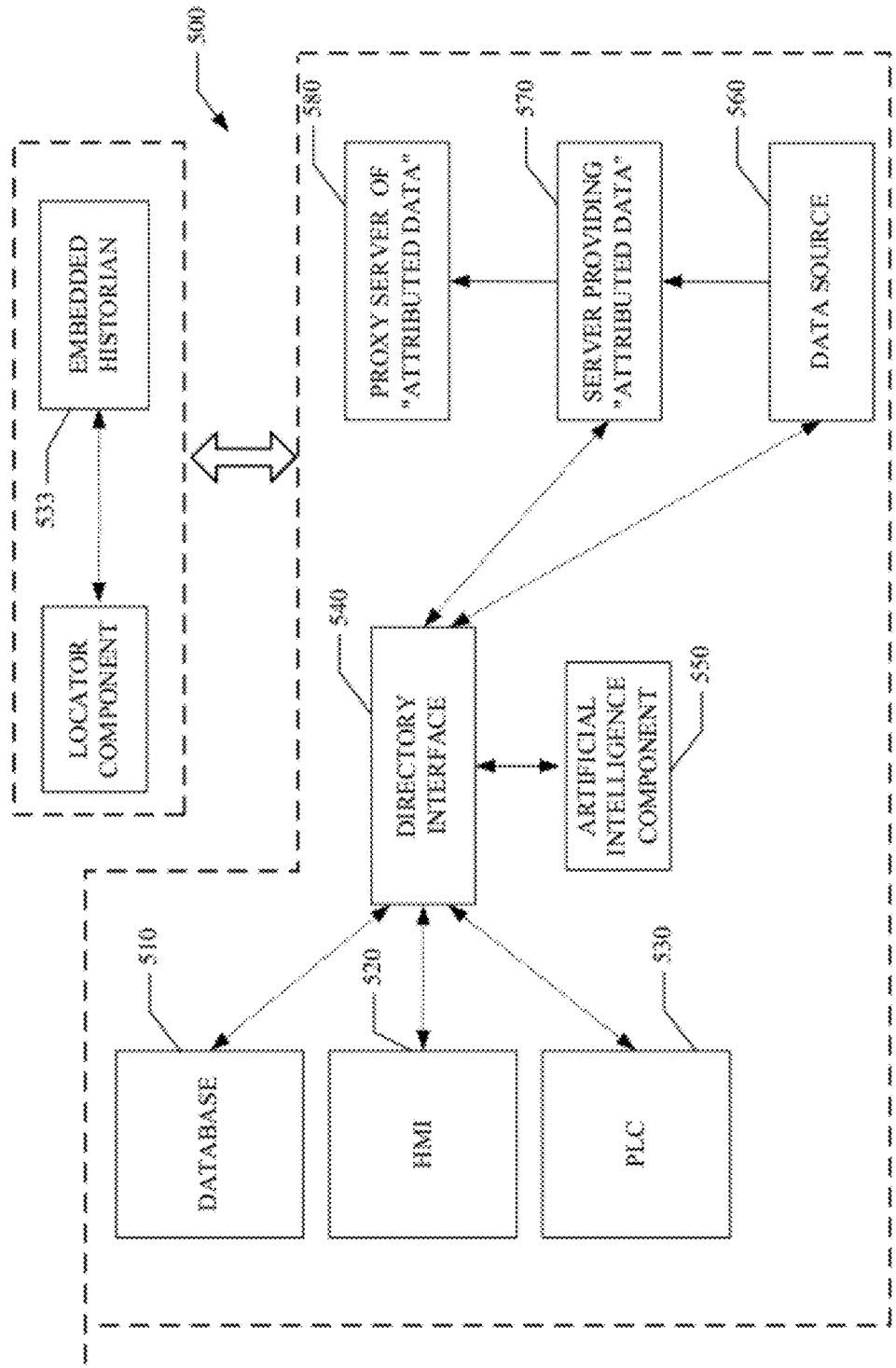
FIG. 5 illustrates an exemplary industrial automation network that employs an embedded historian component that operates in a hierarchical organizational model.

FIG. 5 illustrates an exemplary industrial automation network that employs an embedded historian component 533, to enable high speed data collection (e.g., real time) from the industrial setting 500, which can include a database 510, a human machine interface (HMI) 520 and a programmable logic controller (PLC) 530, and a directory interface 540. The directory interface 540 can further associate with an Artificial Intelligence (AI) component 550 to facilitate efficient identification of desired data within a particular network/application. The directory interface 540 can be employed to provide data from an appropriate location such as the data source 560, a server 570 and/or a proxy server 580. Accordingly, the directory interface 540 can point to a source of data based upon role and requirements (needs) of a requester (e.g., database 510, HMI 520, PLC 530, and the like.) The database 510 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 540 can provide data to the database 510 from the server 570, which provides data with the attributes desired by the database 510.

As illustrated in FIG. 5, the embedded historian 533 can leverage directory interface 540 and other Unified Plant Model (UPM) services to locate other embedded historian components and their configurations, via the locator component of the subject innovation. Such locator component 560 can further detect embedded historians 533 that are distributed on the back plane of an industrial network. The locator component 560 can be part of applications running on a control unit, which can function as a management control center for the industrial network system.

Moreover, the HMI 520 can employ the directory interface 540 to point to data located within the system 500. The HMI 520 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 520 can request data to have particular visualization attributes associated with data in order to easily display such data thereto. For example, the HMI 520 can query the directory interface 540 for a particular data point that has associated visualization attributes. The directory interface 540 can determine the proxy server 580 contains the attributed data point with the desired visualization attributes. For instance, the attributed data point can have a particular graphic that is either referenced or sent along with the data such that this graphic appears within the HMI environment instead of or along with the data value.

As explained earlier, the PLC 530 can be any number of models such as Allen Bradley PLC5, SLC-500, MicoLogix, and the like. The PLC 530 is generally defined as a specialized device employed to provide high-speed, low-level control of a process and/or system. The PLC 530 can be programmed using ladder logic or some form of structured language. Typically, the PLC 530 can utilize data directly from a data source (e.g., data source 560) that can be a sensor, encoder, measurement sensor, switch, valve and the like. The data source 560 can provide data to a register in a PLC and such data can be stored in the PLC if desired. Additionally, data can be updated (e.g., based on a clock cycle) and/or output to other devices for further processing.

Figure 6:
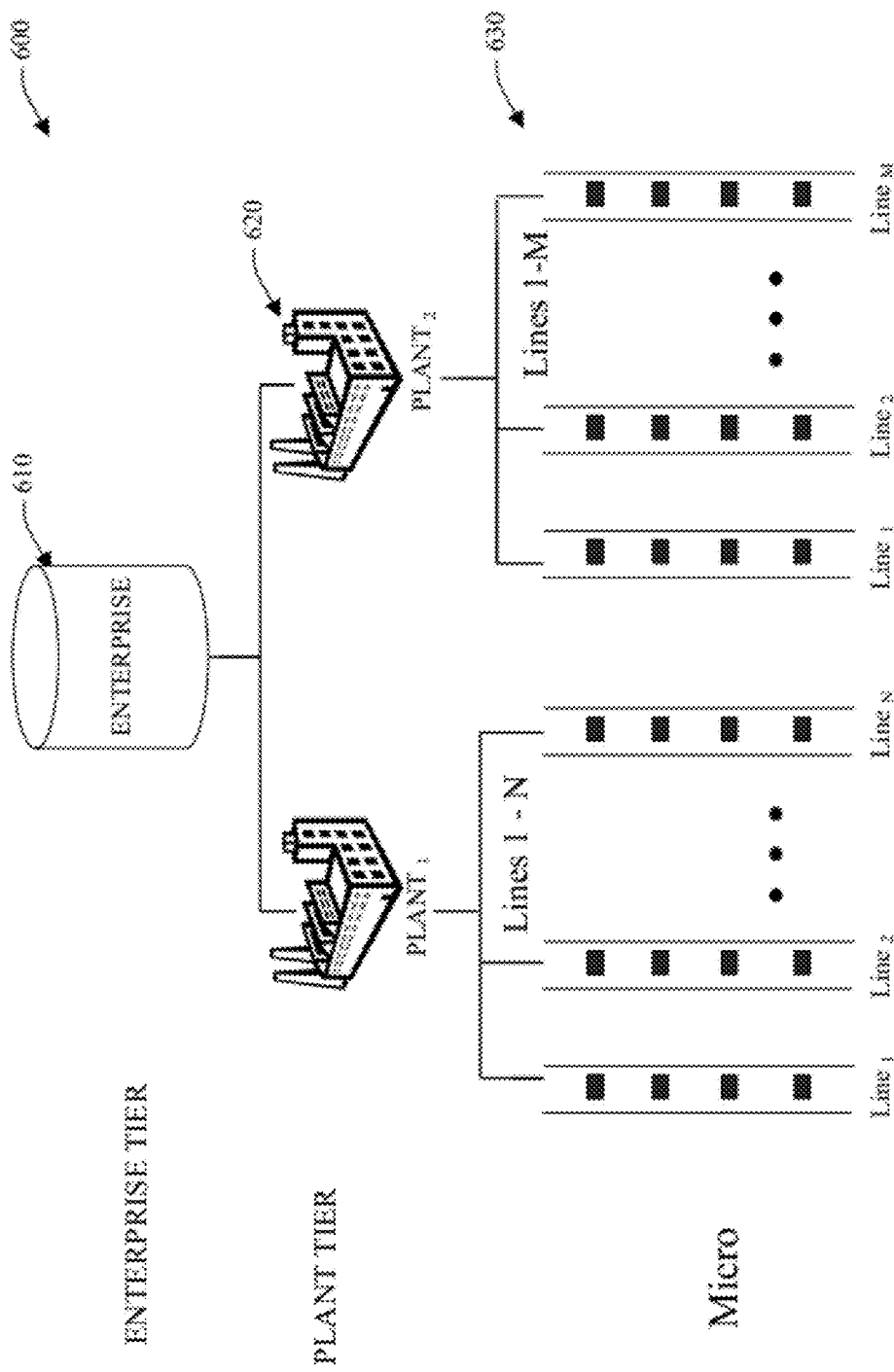
FIG. 6 illustrates an exemplary multi-tiered and distributed historian system, in accordance with an aspect of the subject innovation.

FIG. 6 illustrates an exemplary multi-tiered and distributed historian system 600, in accordance with an aspect of the subject innovation. The exemplary system 600 illustrates three tiered historian level, wherein the highest data collection tier is illustrated and can be referred to as the enterprise tier 610. This tier aggregates data collected from lower level tiers such as from a plant tier 620 and a micro or embedded tier 630. As illustrated, the tiers 610 and 620 can include archival or permanent storage capabilities. In the system 600, data can be collected from two plants at the tier 620, and from a plurality of historian components at tier 630. It is to be appreciated that such an arrangement is exemplary in nature, and other arrangements are well within the realm of the subject innovation.

Typically, the system 600 can be viewed as a Distributed Historian that spans machines, plants, and enterprises. At level 630, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling, having a low communications bandwidth. The plant level 620 aggregates data from Micro or rack-embedded Historians and/or other data sources (e.g., Live Data source). Such can include plant-level querying, analytics, reporting while efficiently storing, retrieving, and managing large amounts of data. This level can also auto-discover data and data model context from Micro Historians located at level 630. Other features of the system 600 can include analysis components, logical units, components for interaction with report elements, embeddable presentation components, replication of configuration, storage, archiving, data compression, summarization/filtering, security, and scalability.

Figure 7:
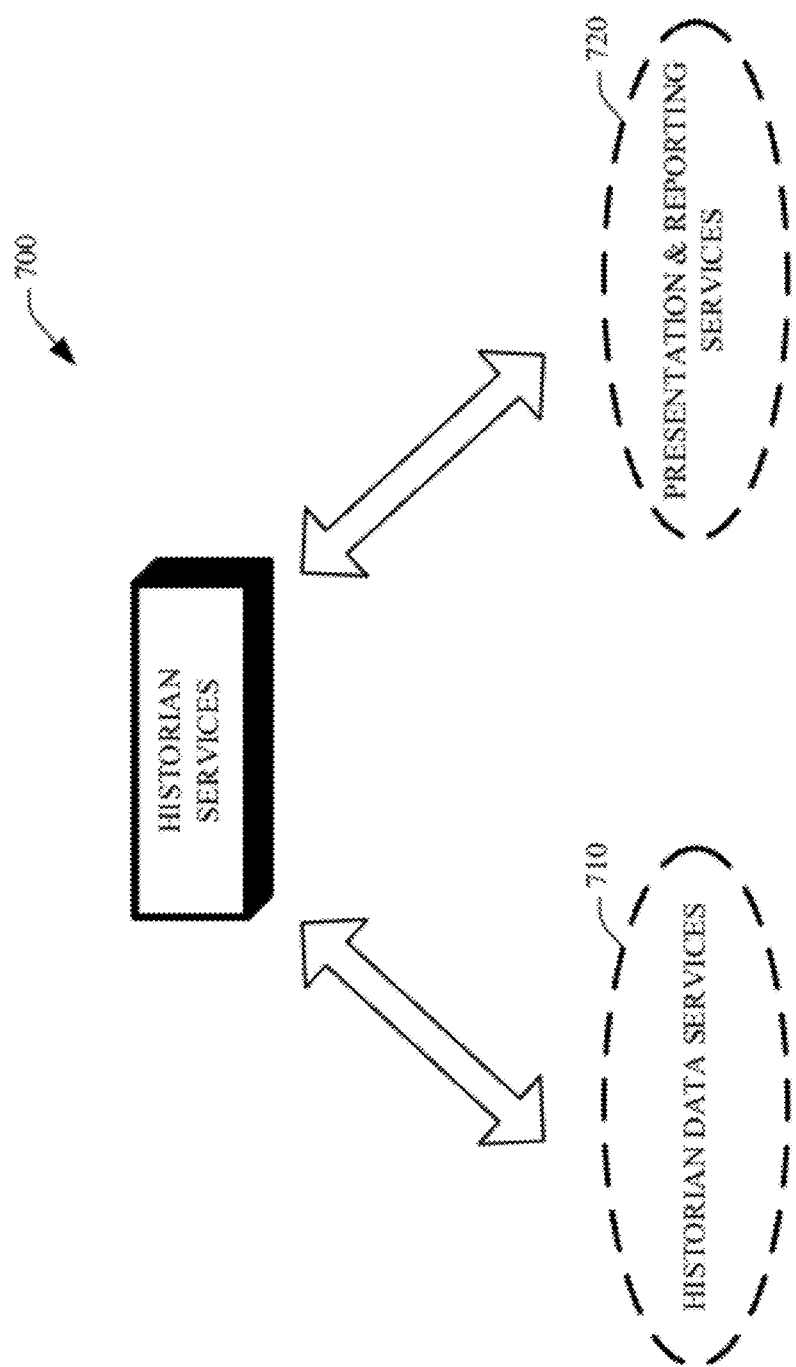
FIG. 7 illustrates historian services that include historian data services and presentation and reporting services.

FIG. 7 illustrates historian services 700 that include historian data services 710 and presentation and reporting services 720. Historian Data Services 710 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 720 (PRS) can supply generic, customizable services for collating and presenting data in a common plant model-defined context. This can include access to stored data, analysis/calculators and query mechanisms, and embeddable, interactive presentation components (e.g., text, charts, SPC). The service 710 can generate reports with various means of presentation/distribution (e.g., web, email) having export capabilities to standard formats (e.g., XML, Excel).

Figure 8:
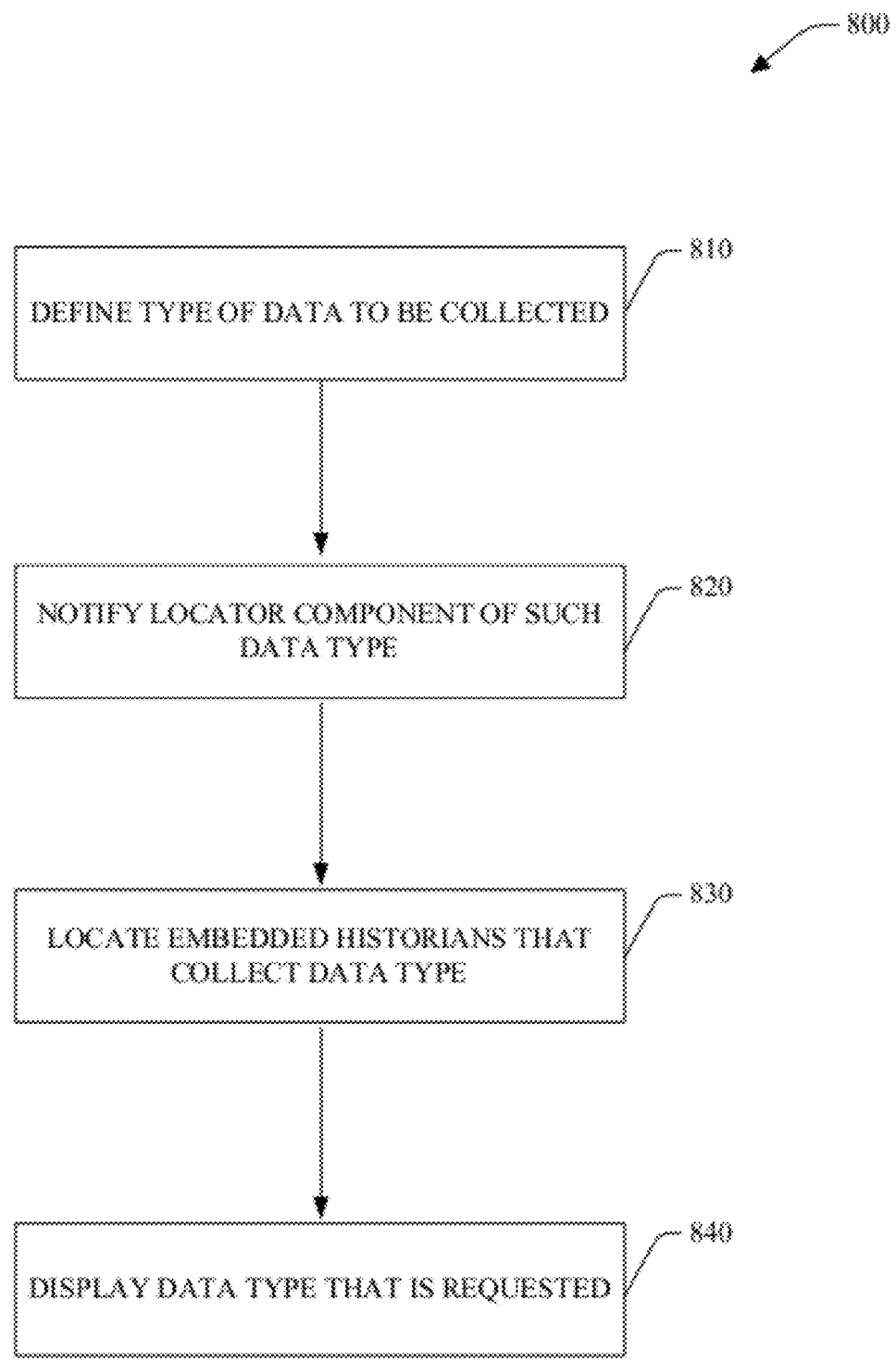
FIG. 8 illustrates a related methodology of embedded historian location and data collection in accordance with an aspect of the subject innovation.

FIG. 8 illustrates a related methodology 800 of embedded historian location and data collection in accordance with an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 810, users can initially determine type of data to be collected. Subsequently, and at 820 the locator component is notified for collection of such data type. The locator component can then locate embedded historians that have collected or have access to a collection of such data type, at 830. Subsequently, the data can be acquired, supplied and reported to the user, at 840.

Figure 9:
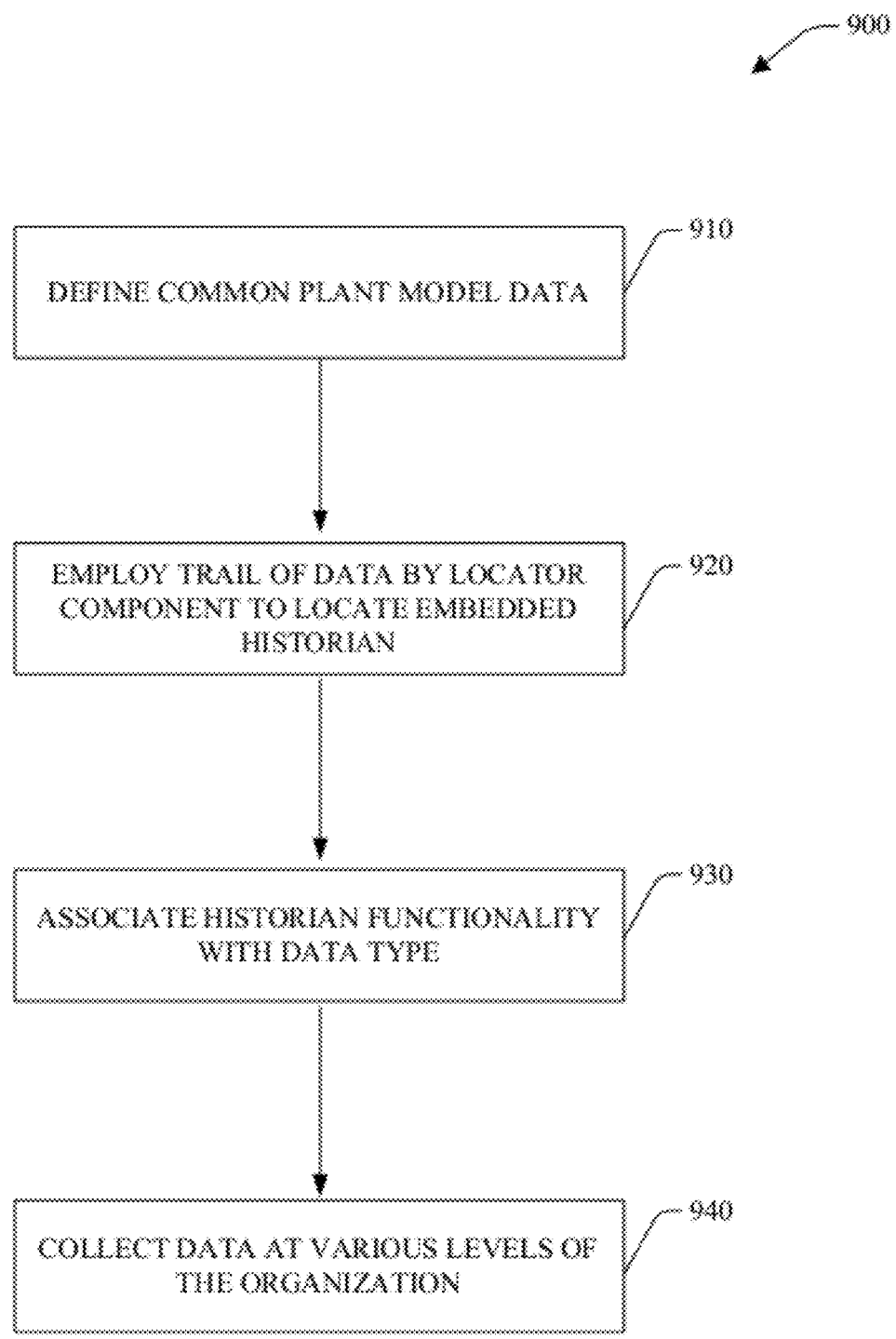
FIG. 9 illustrates a related methodology of data collection, via a plurality of embedded historians that are locatable by the locator component of the subject innovation.

FIG. 9 illustrates a related methodology 900 of data collection, via a plurality of embedded historians that are locatable thru the locator component. Initially, and 910, a common organizational or plant data model is defined. Such model can supply the ability to describe the functionality of data in a system such as can be provided by metadata for example. Next and 920, the locator component can employ trail of data to locate a desired embedded historian. Such can further include employing a directory to determine where the source or destination for a particular embedded historian data structure is located. At 930, embedded historian functionality can be associated with the common data structure, wherein the controller can specify that such data is to be collected by an embedded historian component. Similarly, data can be exposed to embedded historian components according to its metadata or other determined data context. At 940, embedded historian data is collected across various levels of an organization according to the plant data model and via the associated directory service.

Figure 10:
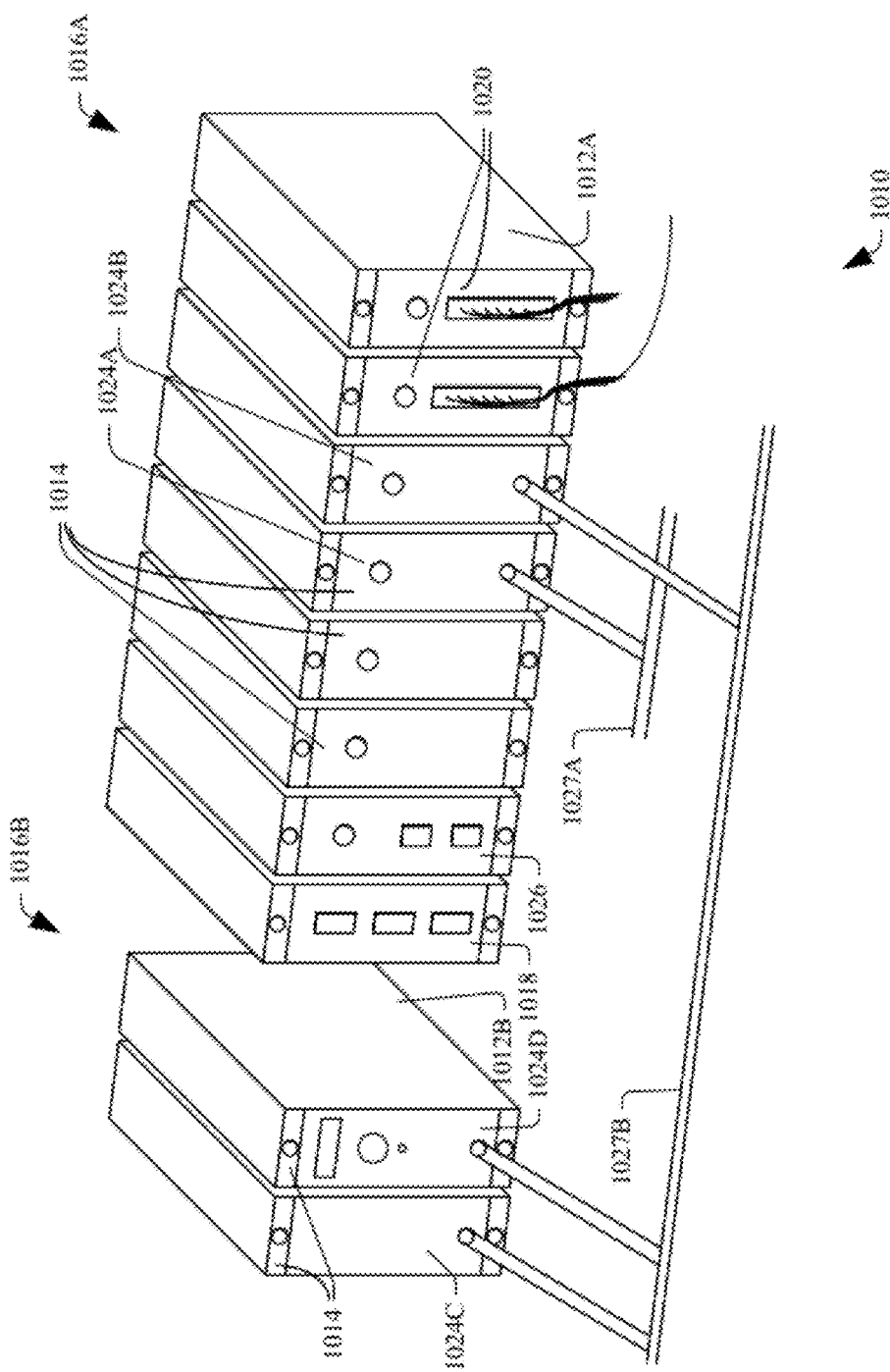
FIG. 10 illustrates a distributed control system that can incorporate an embedded historian component and a locator component in accordance with an aspect of the subject innovation.
Figure 11:
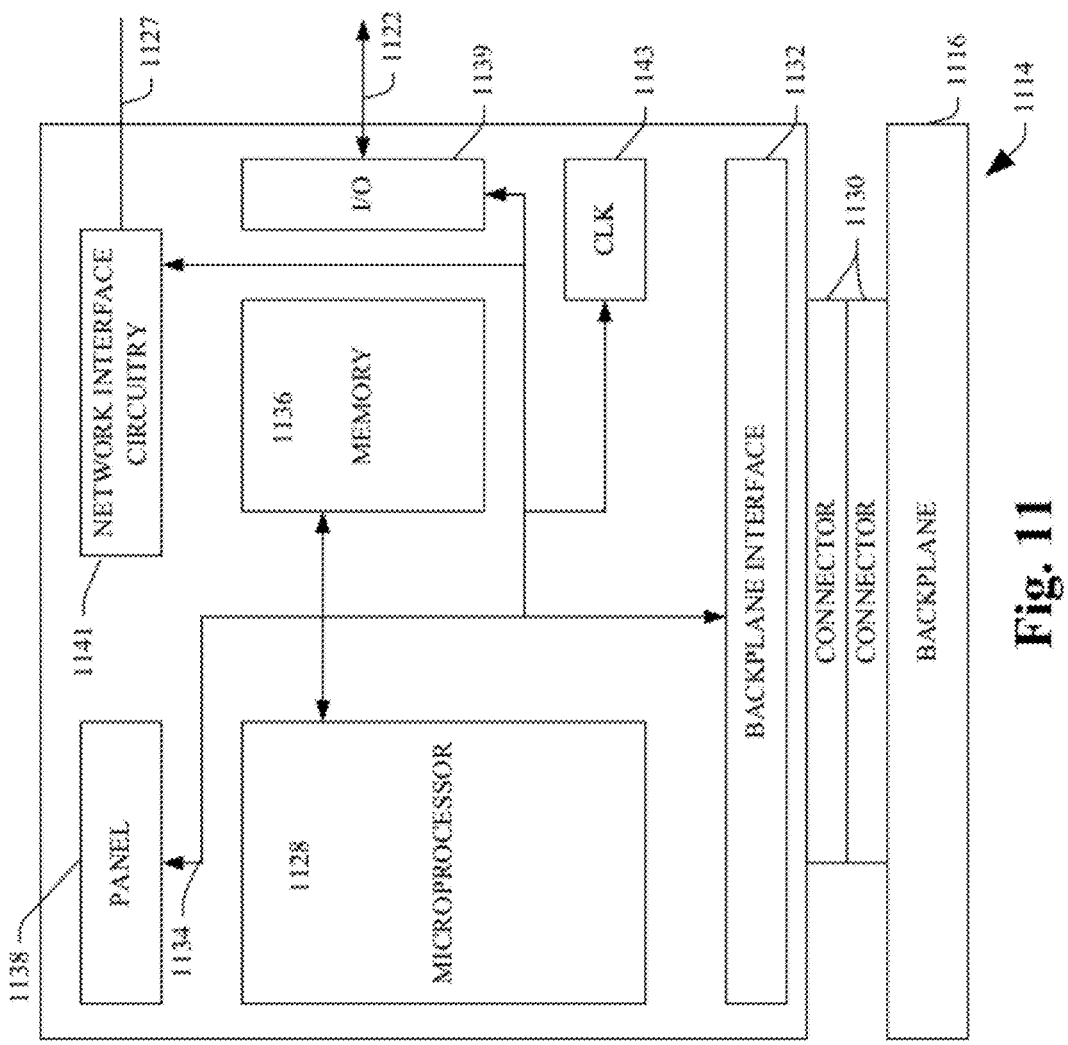
FIG. 11 illustrates an industrial setting with a backplane and associated modules in accordance with an aspect of the subject innovation.

In order to provide context for the various applications in which the aspects of the innovation may be carried out, an exemplary control system that can employ a locator component that tracks embedded historians is now illustrated and described with respect to FIGS. 10 and 11. However, it will be appreciated that the various aspects of the innovation may be employed in association with controllers and control systems other than those illustrated and described herein. A distributed industrial control system 1010 suitable for use with the subject innovation provides a first and second rack 1012A and 1012B for holding a number of functional modules 1014 electrically interconnected by backplanes 1016A and 1016B running along the rear of the racks 1012A and 1012B respectively. Each module 1014 may be individually removed from the rack 1012A or 1012B thereby disconnecting it from its respective backplane 1016 for repair or replacement and to allow custom configuration of the distributed system 1010.

The modules 1014 within the rack 1012A can include, for example, a power supply module 1018, a processor module 1026, two communication modules 1024A and 1024B and two I/O modules 1020. A power supply module 1018 receives an external source of power (not shown) and provides regulated voltages to the other modules 1014 by means of conductors on the backplane 1016A. The I/O modules 1020 provide an interface between inputs from, and outputs to external equipment (not shown) via cabling 1022 attached to the I/O modules 1020 at terminals on their front panels. The I/O modules 1020 convert input signals on the cables 1022 into digital words for transmission on the backplane 1016A. The I/O modules 1020 also convert other digital words from the backplane 1016A to the necessary signal levels for control of equipment.

The communication modules 1024A and 1024B provide a similar interface between the backplane 1016A and one of two external high speed communication networks 1027A and 1027B. The high speed communication networks 1027A and 1027B may connect with other modules 1014 or with remote racks of I/O modules 1020, controller configuration tools or systems, or the like. In the example illustrated in FIG. 10, the high speed communication network 1027A connects with backplane 1016A via the communication module 1024A, whereas the high speed communication network 1027B connects the communication module 1024B with communication modules 1024C and 1024D in rack 1012B. The processor module 1026 processes information provided by the communication modules 1024A and 1024B and the I/O modules 1020 according to a stored control program or routine, and provides output information to the communication module 1024 and the I/O modules 1020 in response to that stored program and received input messages.

FIG. 11 illustrates an exemplary environment that can employ a locator component that identifies embedded historians in accordance with an aspect of the subject innovation. As illustrated, each functional module 1114, is attached to the backplane 1116 by means of a separable electrical connector 1130 that permits the removal of the module 1114 from the backplane 1116 so that it may be replaced or repaired without disturbing the other modules 1114. The backplane 1116 provides the module 1114 with both power and a communication channel to the other modules 1114. Local communication with the other modules 1114 through the backplane 1116 is accomplished by means of a backplane interface 1132 which electrically connects the backplane 1116 through connector 1130. The backplane interface 1132 monitors messages on the backplane 1116 to identify those messages intended for the particular module 1114, based on a message address being part of the message and indicating the message destination. Messages received by the backplane interface 1132 are conveyed to an internal bus 1134 in the module 1114.

The internal bus 1134 joins the backplane interface 1132 with a memory 1136, a microprocessor 1128, front panel circuitry 1138, I/O interface circuitry 1139 and communication network interface circuitry 1141. The microprocessor 1128 can be a general purpose microprocessor providing for the sequential execution of instructions included within the memory 1136 and the reading and writing of data to and from the memory 1136 and the other devices associated with the internal bus 1134. The microprocessor 1128 includes an internal clock circuit (not shown) providing the timing of the microprocessor 1128 but may also communicate with an external clock 1143 of improved precision. This clock 1143 may be a crystal controlled oscillator or other time standard including a radio link to an external time standard. The precision of the clock 1143 may be recorded in the memory 1136 as a quality factor. The panel circuitry 1138 includes status indication lights such as are well known in the art and manually operable switches such as for locking the module 1114 in the off state.

The memory 1136 can comprise control programs or routines executed by the microprocessor 1128 to provide control functions, as well as variables and data necessary for the execution of those programs or routines. For I/O modules, the memory 1136 may also include an I/O table holding the current state of inputs and outputs received from and transmitted to the industrial controller 1110 via the I/O modules 1120. The module 1114 can be adapted to perform the various methodologies of the innovation, via hardware configuration techniques and/or by software programming techniques.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data collection system for an enterprise comprising:
a memory communicatively coupled to a processor, the memory having stored therein computer-executable instructions configured to implement the data collection system, including:
a locator component configured to receive an indication of a type of data to be located, to identify a microhistorian, from a plurality of embedded microhistorians residing on an automation network, that has collected or has access to the type of data; and
a control unit configured to send a request for a subset of data, corresponding to the type of data, to a first socket associated with the microhistorian and bound to a first port number, and to retrieve the subset of data from a second socket associated with the microhistorian and bound to a second port number, wherein the second socket is assigned to the microhistorian in response to reception of the request.

2. The system of claim 1, further comprising a network directory configured to store a network address associated with at least one of the plurality of embedded microhistorians.

3. The system of claim 1, wherein the locator component is further configured to assign the type of data to instruct the microhistorian to log data corresponding to the type by the microhistorian.

4. The system of claim 1, further comprising an organizational model representing at least a portion of the enterprise and configured to expose functionality of the microhistorian to at least one system component associated with the organizational model.

5. The system of claim 4, wherein the organizational model is configured to allow data collected by the plurality of embedded microhistorians to be labeled with metadata, and the locator component is further configured to identify the microhistorian and the subset of data based on the metadata.

6. The system of claim 1, wherein the control unit is configured to aggregate data from at least two of the plurality of embedded microhistorians on the industrial network.

7. A method for retrieving data from an industrial plant, comprising:
specifying a data type to be retrieved from data collected by multiple microhistorians embedded one or more levels of an industrial plant;
identifying a subset of the multiple microhistorians that have collected or have access to the data type;
sending a request for the data type to a first socket, bound to a first port number, associated with at least one of the subset of multiple microhistorians; and
retrieving data corresponding to the data type from the at least one of the multiple microhistorians from a second socket, bound to a second port number, associated with the at least one of the multiple microhistorians.

8. The method of claim 7, further comprising associating the multiple microhistorians with a hierarchical data model representing at least a portion of the industrial plant and configured to expose functionality of the multiple microhistorians to at least one system component associated with the hierarchical model.

9. The method of claim 7, further comprising aggregating data retrieved from the subset of the multiple microhistorians.

10. The method of claim 7, further comprising storing a network address associated with at least one of the multiple microhistorians in a network directory.

11. The method of claim 7, further comprising assigning the subset of the multiple microhistorians to log data corresponding to the data type.

12. The method of claim 7, further comprising assigning the second socket to the second port number in response to the request.

13. The method of claim 7, further comprising receiving, from the first socket, a historian identification associated with the at least one of the subset of multiple microhistorians.

14. A non-transitory computer-readable medium having stored thereon computer-executable instructions that, in response to execution by a computer, cause the computer to perform operations comprising:
receiving an indication of a data type to be retrieved from a set of data collected by multiple microhistorians embedded at one or more levels of an industrial organization;
identifying a subset of the multiple microhistorians that have collected or have access to the data type in response to the receiving;
sending a request for the data type to a first socket associated with at least one of the subset of multiple microhistorians, the first socket bound to a first port number; and
retrieving data conforming to the data type from the at least one of the multiple microhistorians via a second socket associated with the at least one of the multiple microhistorians, the second socket bound to a second port number.

15. The non-transitory computer-readable medium of claim 14, the operations further comprising associating the multiple microhistorians with a hierarchical data model representing the one or more levels of the industrial organization.

16. The non-transitory computer-readable medium of claim 14, the operations further comprising receiving an identification from the at least one of the subset of multiple microhistorians from the first socket.

17. The non-transitory computer-readable medium of claim 14, the operations further comprising storing a network address associated with at least one of the multiple microhistorians in a network directory.

18. The non-transitory computer-readable medium of claim 15, the operations further comprising:
labeling at least a portion of the set of data collected by the multiple microhistorians with metadata; and
identifying the subset of the multiple microhistorians based on the metadata.

19. The non-transitory computer-readable medium of claim 18, the operations further comprising aggregating data collected by the multiple microhistorians in accordance with the metadata.

20. The non-transitory computer-readable medium of claim 14, the operations further comprising assigning the second socket to the second port number in response to the request.

* * * * *